United States Patent [19]

Covington et al.

[11] 4,252,504
[45] Feb. 24, 1981

[54] HELICOPTER BLADE FOLDING SYSTEM

[75] Inventors: Cecil E. Covington, Hurst; David E. Snyder, Arlington, both of Tex.

[73] Assignee: Textron, Inc., Providence, R.I.

[21] Appl. No.: 950,088

[22] Filed: Oct. 10, 1978

[51] Int. Cl.² .............................................. B64C 27/50
[52] U.S. Cl. .................................. 416/143; 416/221
[58] Field of Search ........................ 416/142, 143, 221

[56] References Cited

U.S. PATENT DOCUMENTS

| | | | |
|---|---|---|---|
| 2,023,840 | 12/1935 | Kay et al. | 416/143 |
| 2,967,726 | 1/1961 | Weston | 416/143 X |
| 3,125,164 | 3/1964 | Merrell | 416/143 |
| 3,135,333 | 6/1964 | Cruz et al. | 416/143 |
| 3,158,203 | 11/1964 | Grunfelder | 416/143 |
| 3,749,515 | 6/1971 | Covington et al. | 416/143 |

FOREIGN PATENT DOCUMENTS 1238339  4/1967  Fed. Rep. of Germany .......... 416/143

Primary Examiner—Everette A. Powell, Jr.

[57] ABSTRACT

An apparatus is disclosed for folding a helicopter rotor blade (16) for storage. The blade (16) is secured to a grip (12) by blade bolts (18, 20) which are locked in place by a latch plate (22). Each bolt (18, 20) has an annular groove (30, 31) in which is mated a corresponding aperture (42, 46) in the latch plate (22). To fold the blade (16) the latch plate (22) is translated against the tension of spring (24) to expose a blade bolt (18) to an enlarged aperture (40). This bolt (18) can then be removed to permit pivoting of the blade (16) about the remaining bolt (20). To further secure the latch plate (22), a cap (54) is provided to lock the latch plate (22) to the blade bolt (18).

7 Claims, 8 Drawing Figures

HELICOPTER BLADE FOLDING SYSTEM

TECHNICAL FIELD

This invention relates to rotary wing aircraft and more particularly to apparatus for folding a rotor blade about a blade bolt in a rotor hub.

BACKGROUND ART

Helicopter rotors have heretofore been constructed to permit folding of the blade about the rotor to decrease the space required for storing the aircraft. Many types of rotor blades are attached to the rotor hub by means of a pair of blade bolts. In one type of rotor, removal of one of the blade bolts permits the blade to pivot around the remaining bolt into a folded position. The bolt that is removed can then be used to lock the blade pitch change mechanism to avoid transmittal of the blade droop moment to the rotor control system. A second type of rotor hub and blade folding system is described in U.S. Pat. No. 3,625,631 to Covington Jr. et al.

To make the blade folding system more reliable and safer there exists a need for a latch mechanism to insure that the bolts are held securely in place during flight and to make possible easy inspection by ground crew members to insure that the bolts and lock mechanism are in the correct position for either flight or storage.

DISCLOSURE OF THE INVENTION

In accordance with the present invention there is provided a helicopter rotor blade folding mechanism for pivoting a rotor blade between folded and unfolded positions relative to the rotor hub.

The folding mechanism comprises blade bolts for securing the blade to a grip, the bolts having annular grooves in the segments extending below the grip. A latch plate has first and second slots spaced apart for receiving the blade bolts. The first slot is dimensioned to receive a blade bolt and engage the groove therein when the plate is moved along its longitudinal axis. The second slot is dimensioned to receive a blade bolt and engage the groove therein when the plate is moved transverse to its longitudinal axis. After the plate is engaged in both annular grooves the blade bolts cannot be displaced from the grip.

A spring is provided to tension the plate against the blade bolts to secure it in place.

In one embodiment, a cap is hinged to the latch plate and provided with a hole to receive a blade bolt passing through the plate. The cap is spring clipped to the plate to lock the plate in the annular grooves.

BRIEF DESCRIPTION OF THE DRAWINGS

A more complete understanding of the invention and its advantages will be apparent from the following detailed description taken in conjunction with the accompanying drawings in which.

DETAILED DESCRIPTION

Figure 1:
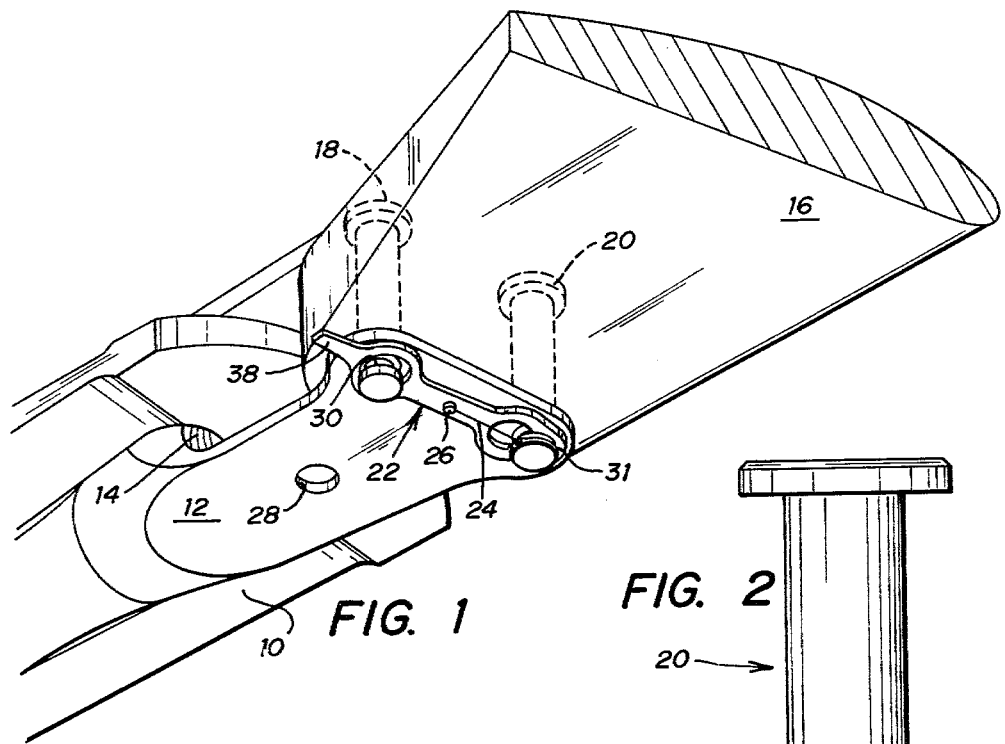
FIG. 1 is a perspective view of a rotor hub, blade and latch mechanism of the present invention.

Referring to FIG. 1 there is shown a hub yoke 10 which is connected to a blade grip 12 through a pitch change bearing 14. A blade 16 is joined to the grip 12 by a lock bolt 18 and a hinge bolt 20.

A latch plate 22 is connected to the bottom extensions of lock bolt 18 and hinge bolt 20 to prevent displacement of the bolts from the grip 12. A spring 24 is connected through a hole in the base of the hinge bolt 20 at one end and is connected to the latch plate 22 by a bolt 26 located in the midportion of the latch plate. Spaced inboard from the lock and hinge bolts is a hole 28 which passes through both the extensions of the grip 12 and through the included portion of the yoke 10.

In the extension of lock bolt 18 below grip 12 there is an annular groove 30. At the same location on hinge bolt 20 there is an annular groove 31.

Figure 2:
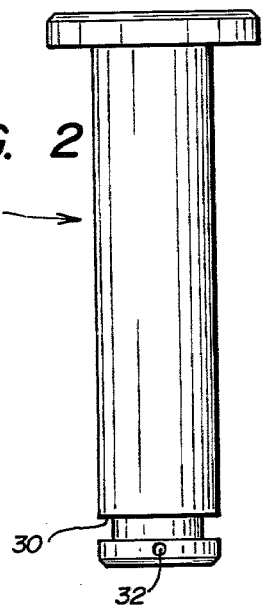
FIG. 2 is an elevation view of a blade bolt used with the present invention.

A blade bolt for retaining the blade 16 is illustrated in detail in FIG. 2. Hinge bolt 20 has formed on the lower end thereof the annular groove 31. Just below groove 31, and in a segment of the bolt having a diameter the same as the body section, there is located a hole 32 for receiving the spring 24. The lock bolt 18 is the same as bolt 20 shown, but without hole 32.

Figure 3:
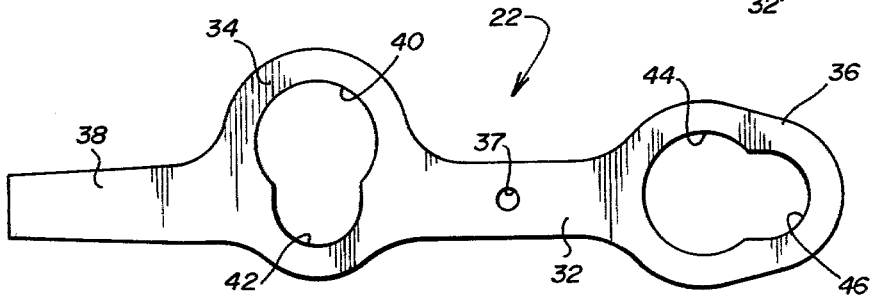
FIG. 3 is a plan view of a latch plate of the present invention.

Latch plate 22 is illustrated with greater detail in FIG. 3. It is typically constructed of sheet steel having a thickness of 0.125 inch. The latch plate has a central elongate body section 32 with expanded width, approximately circular, sections 34 and 36 at either end. A hole 37 is formed in the central section 32 to receive the bolt 26. A handle 38 is formed as an extension of section 34 opposite the central body section 32.

The expanded section 34 has a pair of overlapping circular holes formed therein in a keyhole shape. A first hole 40 is formed in section 34 together with a second hole 42 which is offset from hole 40 and is of lesser diameter. Hole 42 has approximately the same diameter as the segment of lock bolt 18 within groove 30. Hole 40 has a diameter that is slightly greater than that of the body of the lock bolt 18. The centers of holes 40 and 42 are offset transversely from the longitudinal axis of latch plate 22.

At the end of the latch plate 22 in section 36 there are also a pair of overlapping circular holes 44 and 46 in a keyhole shape. Hole 44 is of greater diameter than hole 46 with the diameter of hole 44 being approximately the same as that of the body of the hinge bolt 20 and the diameter of the hole 46 being approximately that of the segment of bolt 20 within groove 31. The centers of the holes 44 and 46 are offset from each other along the longitudinal axis of the latch plate 22.

Figure 4:
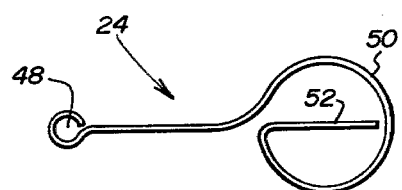
FIG. 4 is a plan view of a spring for retaining the latch plate of the present invention.

Spring 24, as shown in FIG. 4, includes a small loop section at one end forming a circle 48 for receiving bolt 26. Opposite the circle 48 there is formed in the spring 24 a second circle 50 having a diameter to enclose bolt 20. Within the circle 50 of the spring 24 there is included a straight termination segment 52 for insertion within the hole 32 of hinge bolt 20.

Description of the blade folding mechanism while the blade is in the flight position is made in reference to FIGS. 1-4. Lock bolt 18 and hinge bolt 20 securely hold blade 16 to grip 12. In flight, bolts 18 and 20 carry the centrifugal force of the blade 16 and transfer it to the grip 12 which in turn carries the centrifugal force to the yoke 10. It is therefore apparent that the bolts 18 and 20 must be held securely in position during flight in order to maintain safe operation of the aircraft. Bolts 18 and 20 are secured in position in accordance with the present invention by the latch plate 22 and spring 24.

Latch plate 22 is installed in place by first sliding the plate upward onto the extending portion of the hinge bolt 20 through the large diameter hole 44. After the latch plate 22 has been located at the level of the groove 31 the plate is moved horizontally until the hole 46 engages the groove 31. This locks the latch plate 22 onto the bolt 20 to prevent its removal from grip 12. Once the latch plate 22 is in this position it is rotated about the bolt 20 until the large hole 40 is aligned with the lock bolt 18. Latch plate 22 is then raised onto bolt 18 until it is located in the region of the groove 30. After it is in this position the latch plate 22 is rotated about the bolt 20 until the smaller hole 42 engages groove 30. This locks bolt 18 in place.

Spring 24 is connected to the bolt 20 by slipping the circle section 50 over the bottom of the bolt and sliding the straight portion 52 into the hole 32. The opposite end of spring 24, circle 48, is connected by bolt 26 to hole 37 in latch plate 22. Spring 24 is tensioned in such a manner as to cause the latch plate 22 to rotate clockwise about bolt 20, as viewed from the bottom of the blade 16, so as to hold the small circle 42 of the latch plate against the lock bolt 18. When tensioned in this position the latch plate 22 prevents removal of either of the bolts 18 or 20.

Figure 5:
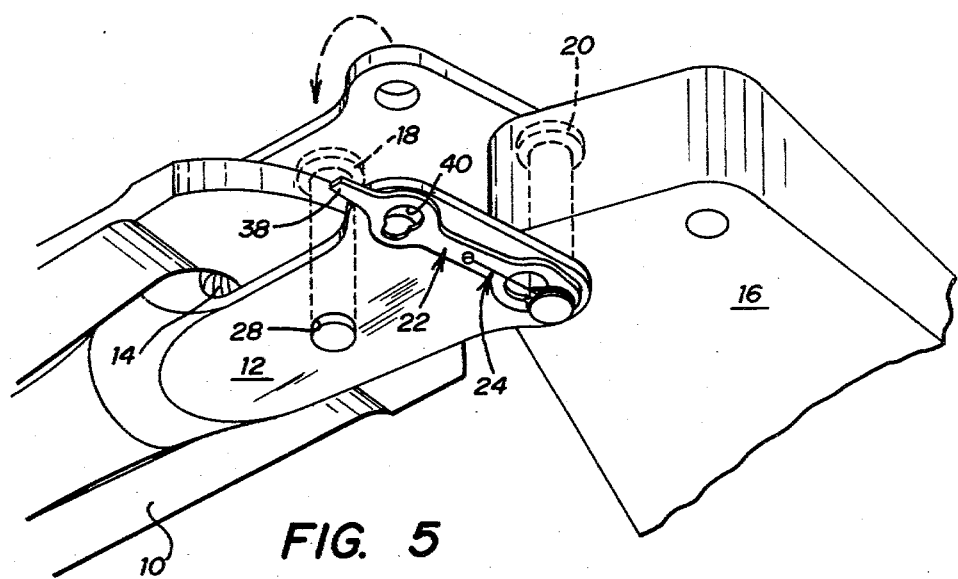
FIG. 5 is a perspective view of a blade which has been folded to the storage position by rotating it about a hinge bolt.

Folding of the blade 16 is described in reference to FIG. 5 which shows the blade in the folded position. In order to fold the blade 16 handle 38 of latch plate 22 is pulled in the inboard direction to displace the latch plate 22 and align the large diameter hole 40 with the lock bolt 18. After the hole 40 is aligned with the bolt 18 the bolt can be removed upward and withdrawn from the grip and blade. Lock bolt 18 is then placed in hole 28 to lock the grip 12 relative to the yoke 10 to prevent stress on the control linkage caused by the weight of the blade tending to rotate the grip 12.

Figure 6:
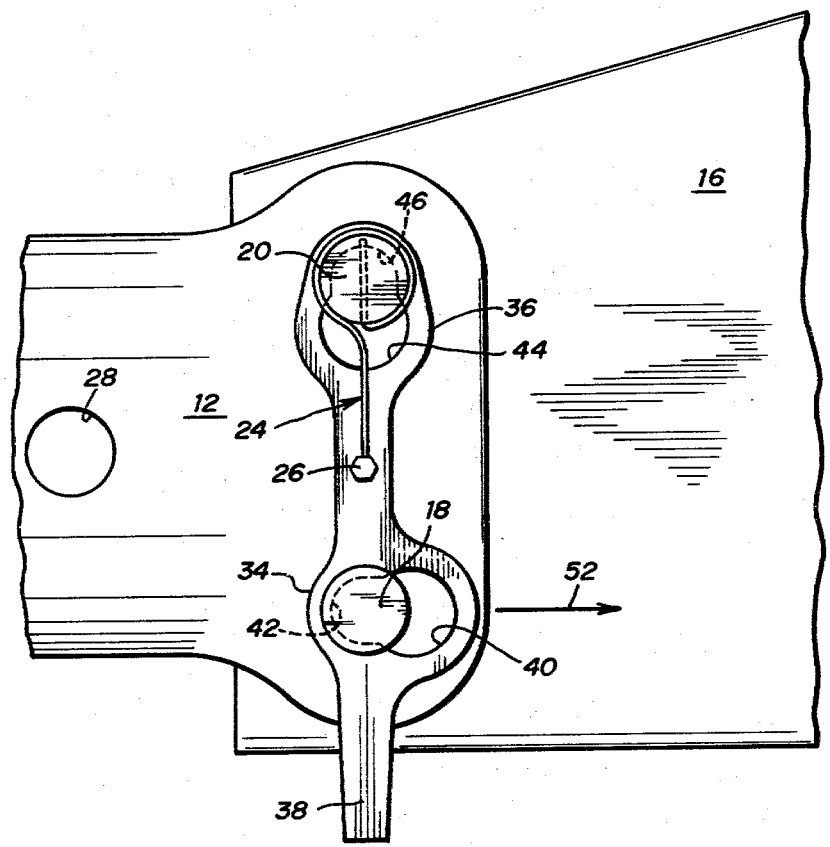
FIG. 6 is a bottom view of the latch plate and spring of the present invention in the lock position as installed on a rotor hub and blade.

A further illustration of the operation of the latch mechanism of the present invention is shown in FIG. 6. This view shows the latch plate 22, rotor blade 16 and grip 12 as viewed from the bottom. In the flight position the latch 22 is positioned so that the small diameter hole 46 is positioned in the groove 31 of hinge bolt 20 and the small diameter hole 42 is within the groove 30 of lock bolt 18. This holds the bolts 18 and 20 in position so that the rotor blade 16 is securely attached to the grip 12 for flight. Spring 24 is flexed so that it tends to hold the latch plate 22 in this position. The locking arrangement is further designed such that the centrifugal force on the latch plate 22, which drives the plate outward as shown by arrow 52, also acts to hold the latch plate in the locked position against lock bolt 18.

To fold the rotor blade 16, as noted above, handle 38 of the latch plate 22 is pulled in the inboard direction toward the grip 12 to place the large diameter hole 40 in alignment with the lock bolt 18. When the latch plate is in this position lock bolt 18 can be removed to allow the blade 16 to be rotated about hinge bolt 20.

Figure 7:
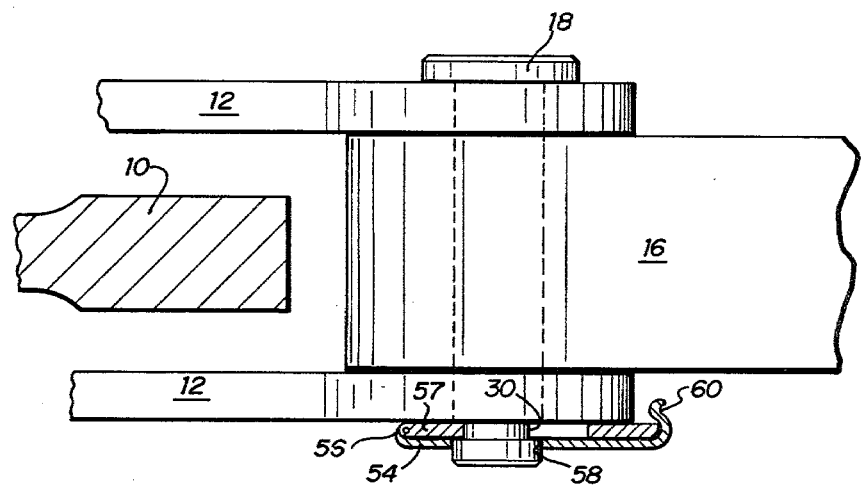
FIG. 7 is an elevation view of a cap and latch plate of the present invention.
Figure 8:
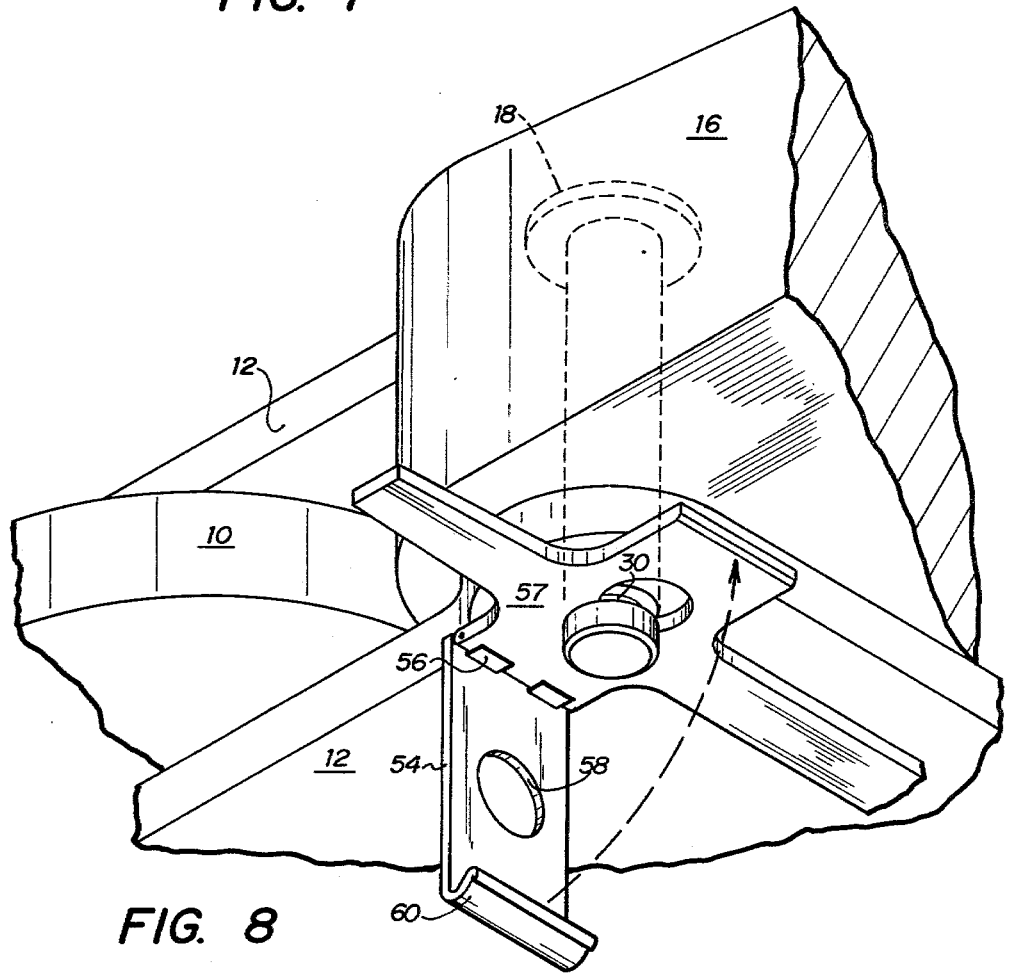
FIG. 8 is a perspective view of the cap and latch plate of the present invention with the cap in the open position.

An additional safety feature for the folding apparatus of the present invention is illustrated in FIGS. 7 and 8. A cap 54 is connected by means of a hinge 56 to the edge of a latch plate 57 adjacent the lock bolt 18. Cap 54 includes a hole 58 of slightly greater diameter than the body of the bolt 18. Hole 58 is located such that when the cap 54 is rotated about the hinge 56 hole 58 engages bolt 18. Disposed on the opposite side of hole 58 from hinge 56, cap 54 has a spring clip 60 which is spring tensioned to fit over the edge of latch plate 57. Thus, when the cap 54 is clipped into position as shown in FIG. 7, latch plate 57 is locked in place in the groove 30 of the lock bolt 18.

Cap 54 is shown in the open position in FIG. 8. The cap is opened by bending the spring clip 60 in the outboard direction to release the clip from the edge of the latch plate 57. Once the clip 60 is released the cap 54 pivots about the hinge 56. After the cap 54 has been released, the latch plate 57 can be disengaged from the lock bolt 18 as described above by operation of the handle 38. Cap 54 provides an additional function by indicating to the ground crew the condition of the latch plate 57, whether the blades are in the flight condition with the cap 54 snapped into position on the latch plate 57 or that the blades are in the fold condition with the cap 54 open and hanging loosely.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

We claim:

1. In a helicopter rotor unit where a blade and grip have aligned holes for securing said blade to said grip, apparatus for faciliating folding said blade comprising in combination,
    (a) blade bolts mating in said holes for securing said blade to said grip, each of said bolts having an annular groove therein in the extension of said bolt below said grip,
    (b) a plate having first and second holes therein spaced a distance apart to receive said bolts, said first hole dimensioned to receive a first of said bolts, said second hole dimensioned to receive a second of said bolts and engage said groove therein when said plate is rotated about said first bolt for locking said plate to said bolts, and
    (c) a spring connected between said first bolt and said plate and tensioned for holding the wall of said second hole engaged to said groove in said second bolt.

2. In a helicopter rotor unit where a blade and grip have aligned holes for securing said blade to said grip, apparatus for facilitating folding said blade comprising in combination,
    (a) blade bolts mating in said holes for securing said blade to said grip, each of said bolts having an annular groove therein in the extension of said bolt below said grip,
    (b) a plate having first and second slots therein spaced a distance apart to receive said bolts, said first slot dimensioned to receive a first of said bolts and engage said groove therein when said plate is translated along the longitudinal axis thereof, said second slot dimensioned to receive a second of said bolts and engage said groove therein when said plate is rotated transversely to the longitudinal axis thereof for locking said plate to said bolts, and (c) a spring connected between said first bolt and said plate and tensioned for holding the wall of said second slot engaged to said groove in said second bolt.

3. The apparatus of claim 2 including a handle joined longitudinally to the edge of said plate adjacent said second slot for pivoting said plate about said first bolt.

4. The apparatus of claim 2 including a yoke connected through a pitch bearing to said grip, said yoke and said grip having holes aligned therein to receive one of said bolts to lock said grip relative to said yoke when said blade is in the folded position.

5. The apparatus of claim 2 including a cap hinged at a first edge to said plate and having a spring clip at a second edge opposite said first edge for engaging said plate, said cap having a hole therein for receiving said second bolt when said cap is locked to said plate for holding said plate locked to said bolt.

6. In a helicopter rotor where a blade and grip have aligned holes for securing said blade to said grip, apparatus for facilitating folding said blade for storage, comprising in combination, (a) blade bolts for securing said blade to said grip, each of said bolts having an annular groove therein in the extension of said bolt below said grip, (b) an elongate plate having first and second apertures therein spaced apart to align with a first and second of said bolts, said first aperture comprising overlapping first and second circular holes having centers offset and spaced along the longitudinal axis of said plate, the diameter of said first hole being approximately the same as the diameter of said bolts, and the diameter of said second hole being approximately the same as the diameter of said bolts within said grooves, said second aperture comprising overlapping third and fourth circular holes with diameters corresponding to said first and second holes respectively, the centers of said third and fourth holes offset and spaced along a line transverse to the longitudinal axis of said plate, and (c) a spring connected to said plate and to one of said bolts for tensioning said plate against said bolts when said plate is engaging said grooves.

7. In a helicopter rotor where a blade and grip have aligned holes for securing said blade to said grip, apparatus for facilitating folding of said blade, comprising in combination, (a) blade bolts for securing said blade to said grip, each of said bolts having an annular groove therein in the extension of said bolt below said grip, (b) a plate having first and second keyhole shaped apertures therein spaced apart for receiving said blade bolts, said first aperture elongate and extending along the longitudinal axis of said plate with a first width for receiving a first of said bolts and a second width approximately equal to the diameter of the section of said bolts within said grooves, said second aperture elongate and extending transverse to the longitudinal axis of said plate with a first width for receiving a second of said bolts and a second width approximately equal to the diameter of the section of said blade bolts within said grooves, said plate capable of placement over said blade bolts for locking into said grooves to prevent withdrawal of said bolts from said grip, and (c) a spring connected to one of said bolts and to said plate said spring tensioned to force the second width segment of said second aperture against the annular groove segment of said bolt passing through said second aperture for locking said plate to said bolts.

* * * * *